(12) United States Patent
Zhang et al.

(10) Patent No.: US 8,573,656 B1
(45) Date of Patent: Nov. 5, 2013

(54) KNOT-TYING DEVICE AND METHOD

(75) Inventors: Qin Zhang, Richland, WA (US); Long He, Prosser, WA (US); Henry J. Charvet, Grandview, WA (US)

(73) Assignee: S.S. Steiner, Inc., New York, NY (US)

( * ) Notice: Subject to any disclaimer, the term of this patent is extended or adjusted under 35 U.S.C. 154(b) by 5 days.

(21) Appl. No.: 13/559,408

(22) Filed: Jul. 26, 2012

Related U.S. Application Data

(60) Provisional application No. 61/567,498, filed on Dec. 6, 2011.

(51) Int. Cl.
*B65H 69/04* (2006.01)

(52) U.S. Cl.
USPC .............................................. 289/2

(58) Field of Classification Search
USPC ................... 289/1.5, 2, 4, 13, 15, 16, 18.1
See application file for complete search history.

(56) References Cited

U.S. PATENT DOCUMENTS

| | | | |
|---|---|---|---|
| 3,563,583 A | 2/1971 | Gentry et al. ...................... 289/2 |
| 3,583,131 A * | 6/1971 | Gaudlitz ....................... 53/138.3 |
| 3,585,755 A | 6/1971 | Thomas ............................. 47/45 |
| 3,940,169 A * | 2/1976 | Kock ............................... 289/1.5 |
| 5,169,079 A * | 12/1992 | Renzetti ......................... 242/446 |
| 5,716,020 A * | 2/1998 | Shults .......................... 242/443 |
| 6,401,442 B1 * | 6/2002 | Root et al. ........................ 57/27 |
| 6,419,283 B1 * | 7/2002 | Thomas et al. .................... 289/2 |
| 6,543,819 B2 * | 4/2003 | Hakimain .......................... 289/2 |
| 6,641,181 B2 | 11/2003 | Thomas et al. .................... 289/2 |
| 6,648,378 B1 | 11/2003 | Torres et al. .................... 289/1.5 |
| 6,716,224 B2 | 4/2004 | Singhatat ....................... 606/148 |
| 6,820,904 B1 * | 11/2004 | Goldstein .................... 289/18.1 |
| 6,964,437 B2 * | 11/2005 | Massotte et al. ............... 289/1.5 |
| 7,647,759 B2 * | 1/2010 | Braun et al. ..................... 57/2.3 |
| 7,841,631 B2 * | 11/2010 | Holmes et al. .................... 289/2 |
| 8,491,018 B2 * | 7/2013 | Borrowman et al. ............. 289/2 |
| 2002/0060455 A1 * | 5/2002 | Thomas et al. .................... 289/2 |
| 2002/0171245 A1 * | 11/2002 | Thomas et al. .................... 289/3 |
| 2003/0020280 A1 * | 1/2003 | Hakimain .......................... 289/2 |
| 2003/0111841 A1 * | 6/2003 | Massotte et al. ................ 289/14 |
| 2006/0012176 A1 * | 1/2006 | Schoonheere et al. ............ 289/2 |
| 2010/0148503 A1 * | 6/2010 | Holmes et al. .................... 289/2 |
| 2011/0233930 A1 * | 9/2011 | Borrowman et al. ............. 289/2 |
| 2011/0316275 A1 * | 12/2011 | Wainohu et al. .................. 289/2 |

* cited by examiner

*Primary Examiner* — Shaun R Hurley
(74) *Attorney, Agent, or Firm* — Hayes Soloway P.C.

(57) ABSTRACT

A multi-actuator robotic device for performing knot-tying is provided herein. The device performs an automatic knot-tying to mimic human hand making a clove hitch knot using a sequence of coordinated string delivery and capturing actions and is particularly useful in the field of hop twining. In one example, the device uses four pneumatic actuators to perform nine coordinated knot-tying actions.

16 Claims, 4 Drawing Sheets

KNOT-TYING DEVICE AND METHOD

CROSS REFERENCE TO RELATED APPLICATION

This Application claims priority from U.S. Provisional Application Ser. No. 61/567,498, filed Dec. 6, 2011, the contents of which are incorporated herein by reference in its entirety.

FIELD OF THE INVENTION

This disclosure relates generally to automated devices for knot-tying. The disclosure has particular utility as a robotic knot-tying device that is useful for tying knots on overhead trellis wires in hop twining, and will be described in connection with such utility, although other utilities are possible.

BACKGROUND OF THE INVENTION

Hop plant is a vigorous climbing herbaceous perennial, usually trained to grow up on strings in commercial production. The string is used to provide a connection between the ground and the overhead trellis wires for hop plants. The twining process comprises two primary tasks: to tie an end of the string in a knot on the trellis wire and to stake the other end of the string into the ground. Currently, the knot tying task in hop production fields is performed manually by skilled workers.

Trellis networks are usually 18 feet off the ground and twining is labor intensive. Motivated by shortage in skilled twinning worker supply and increasing labor costs, hop producers have a significant need for practical, reliable automated solutions to twining operation. There have been few developments in hop twining in recent history. For example, Gentry and Giannini, in U.S. Pat. No. 3,563,583, describe a knot-tying machine designed for providing a series of knots in selected spaced locations on a horizontal wire.

SUMMARY OF THE INVENTION

The present disclosure provides a device and method for automating the tying of a secure knot (as opposed to a slip knot) about a structure, e.g., a wire. More particularly, in one aspect, the present disclosure provides a knot-tying device for tying a secure knot around a structure with a string. The device includes a clip attached to the end of a clip support arm, the clip support arm being rotatably attached to a first actuator, wherein the clip support arm is curved to cross over the structure when rotated, and wherein the clip attaches to the end of the string. A motion arm is attached to a second actuator for rotating the clip support arm relative to the structure. A rod is attached to a third actuator for limiting motion of the string during rotation of the clip support arm by the motion arm. And, a hook is attached to a fourth actuator for retrieving the end of the string from the clip. Completing the device is a controller for controlling motion of the actuators.

In another aspect, the disclosure provides a method for tying a knot around a wire with a piece of string, using the aforesaid device. The method includes the step of activating the first actuator to move from an original clip support arm position and rotate the clip support arm about the wire; attaching the end of the string to the clip; using the first actuator to return the clip support arm to the original clip support arm position, thereby drawing the end of the string over the wire; activating the third actuator to extend the rod from an original rod position; activating the fourth actuator to extend the hook; activating the second actuator to rotate the clip support arm relative to the wire, wherein motion of the string is limited by the rod, thereby forming a loop; activating the first actuator to rotate the clip support arm around the wire; activating the fourth actuator to retract the hook, wherein the clip releases the end of the string which is then carried by the hook through the loop; and activating the first, second, and third actuators to return the rod to the original rod position and the clip support arm to the original clip support arm position.

Other systems, methods, features, and advantages of the present disclosure will be or become apparent to one with skill in the art upon examination of the following drawings and detailed description. The features, functions and advantages that have been discussed can be achieved independently in various embodiments of the present invention or may be combined in yet other embodiments further details of which can be seen with reference to the following description and drawings.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

In the following description, reference is made to the accompanying drawings, which form a part hereof, and in which is shown, by way of illustration, various embodiments of the present disclosure. It is understood that other embodiments may be utilized and changes may be made without departing from the scope of the present invention.

Figure 1:
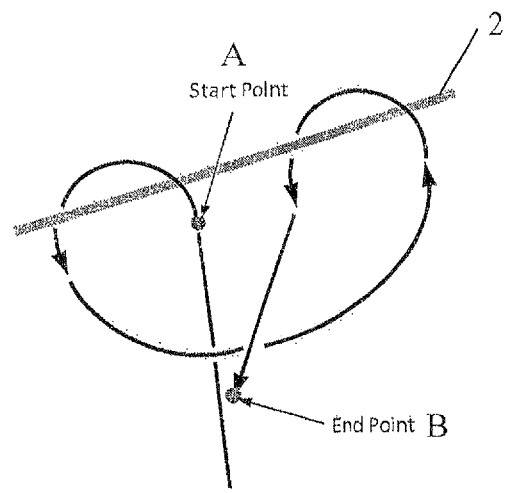
FIG. 1 is a schematic showing a trajectory plan for knot-tying in accordance with the present disclosure.

One aspect of the present disclosure provides a knot-tying device useful, e.g. for tying knots on overhead trellis wires in hop twining. In an example of a device in accordance with the first aspect of the present disclosure, the device is constructed to perform a knot (clove-hitch) illustrated in FIG. 1. In this knotting process, a string is brought to start point A, proximate to wire 2. Next, the string is brought over the wire, around the string, and over the wire again to form two loops. Finally, with the end of the string at end point B, tension is applied to the string to tighten the knot. This knotting method has been used successfully in hop production for decades.

Figure 2:
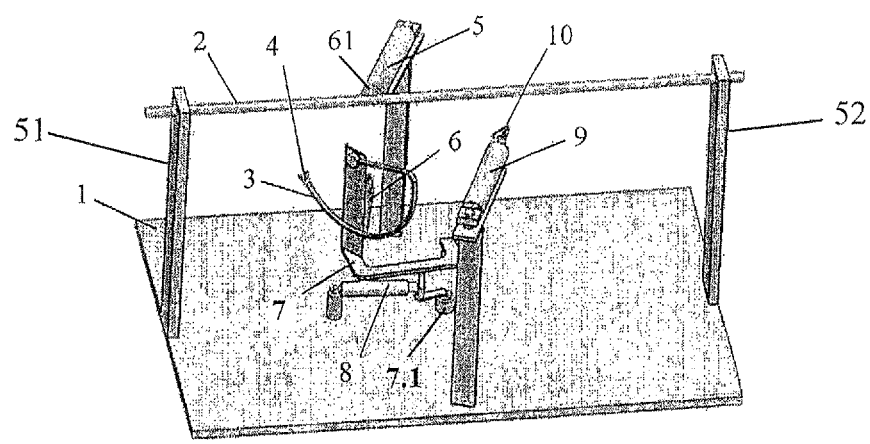
FIG. 2 is an illustration schematically showing one example of a knot-tying device in accordance with the present disclosure.
Figure 3:
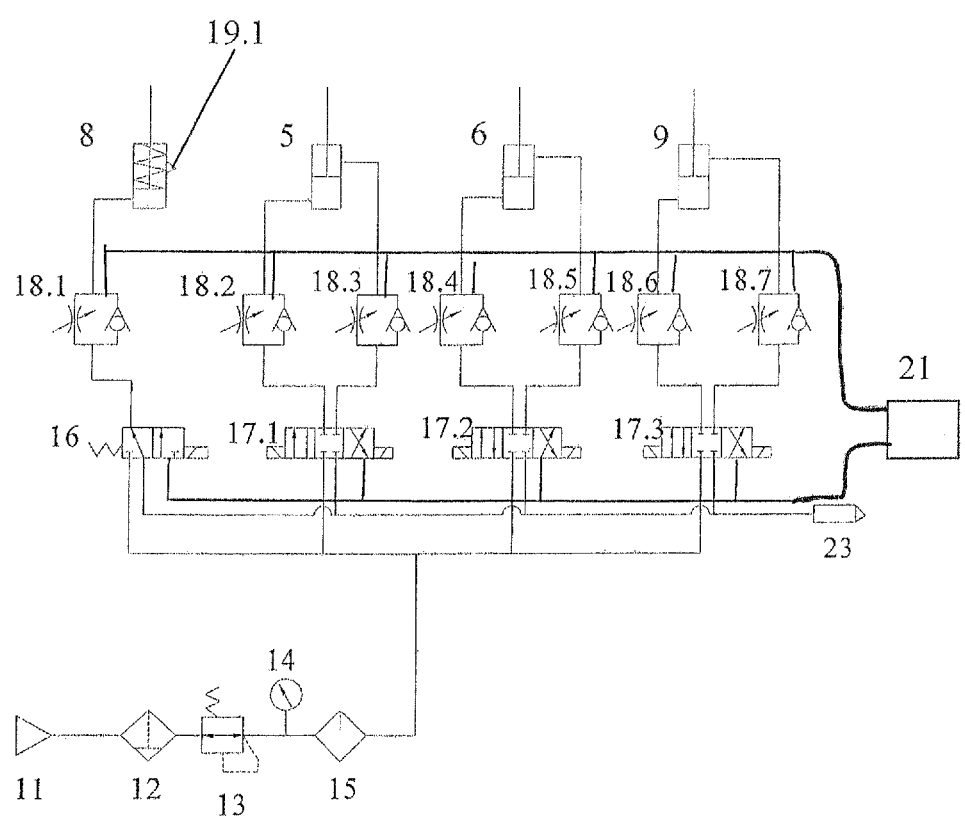
FIG. 3 is a schematic showing the operation of the pneumatic system of the knot-tying device shown in FIG. 2.
Figure 4A:
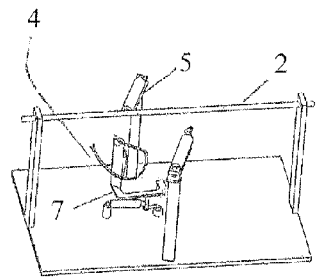
FIGS. 4(a)-4(i) are illustrations of different stages of the knot-tying device of FIG. 2 during operation.
Figure 4B:
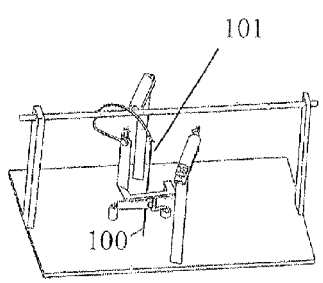
Figure 4C:
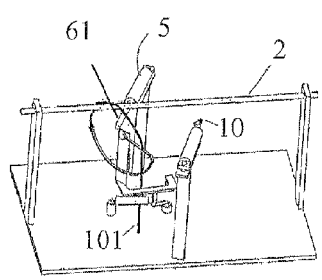
Figure 4D:
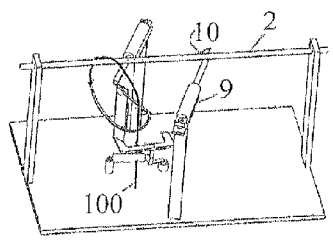
Figure 4E:
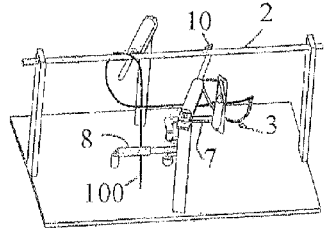
Figure 4F:
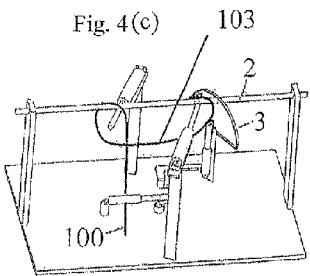
Figure 4G:
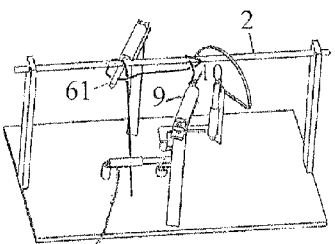
Figure 4H:
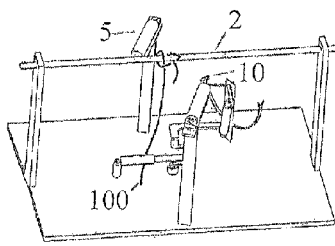
Figure 4I:
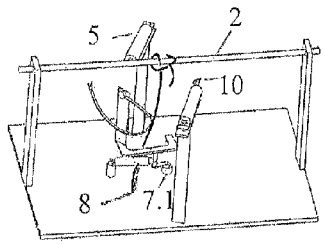
Figure 5:
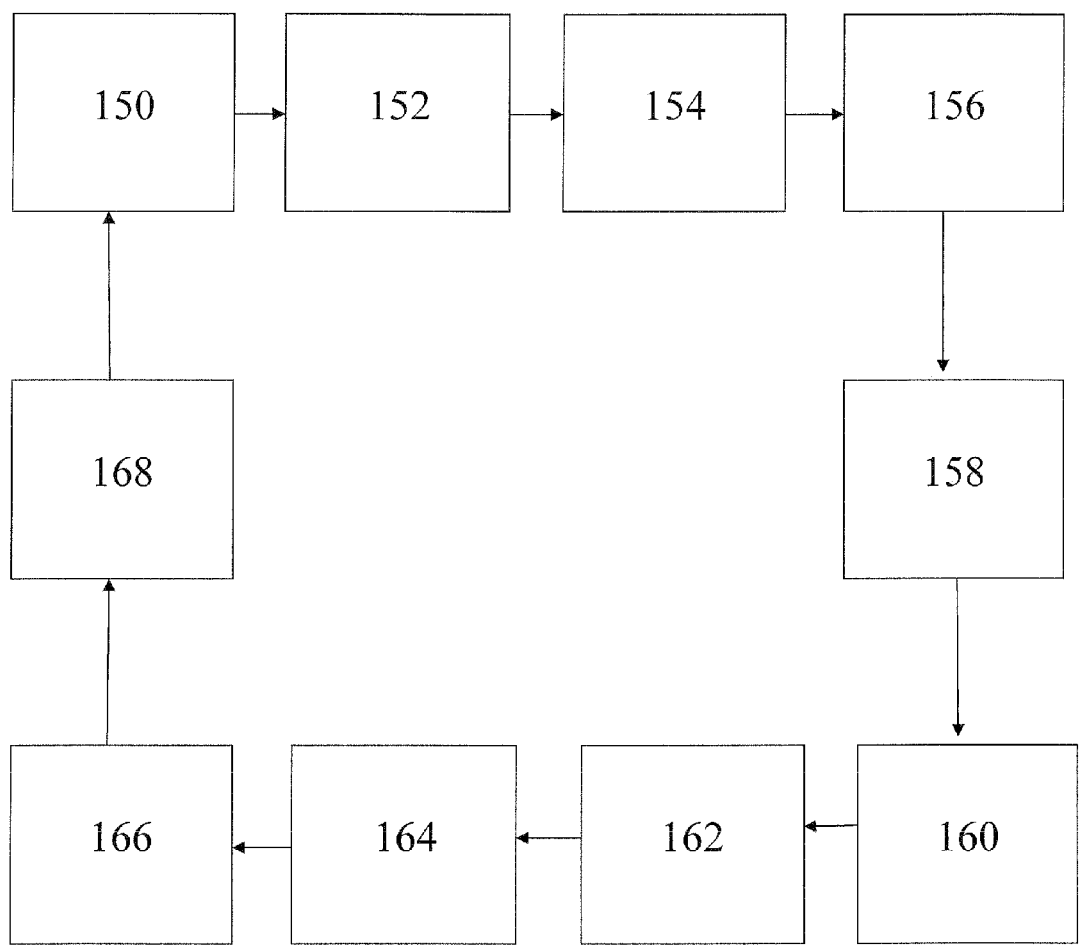
FIG. 5 is a flow diagram illustrating the knot-tying method of the present disclosure.

In order to perform the knot according to the planned trajectory, the disclosure provides a multi-actuator pneumatic knotting device (see FIGS. 2-4). As shown in FIG. 2, the exemplary device is designed to tie a clove hitch knot on a structure (wire 2), as demonstrated in FIG. 1. The device comprises a support structure in the form of base 1; two arms 51, 52 for holding the wire in place; a clip 4; a rod 61 driven by pneumatic cylinder 5; a clip support arm 3 driven by pneumatic cylinder 6; a motion arm 7 driven by pneumatic cylinder 8; and a hook 10 controlled by pneumatic cylinder 9.

Referring also to FIGS. 4(*a*)-4(*i*) clip 4 is used to carry the end 101 of string 100 to the start point of the knotting process. Pneumatic cylinder 6 controls the rotational motion of the clip support arm over the wire 2. Rod 61 is driven by pneumatic cylinder 5 to limit the motion of the string as the clip support arm is moved by pneumatic cylinder 8 and motion arm 7. The clip support arm 3 is u-shaped or c-shaped and oriented so that it may adequately carry the end 101 of the string 100 around wire 2 and around the string to form loops as it is moved by the actuation of motion arm 7. In the exemplary device shown, pneumatic cylinder 6 is actually mounted to one end of the motion arm 7 and motion arm 7 moves by rotating about pivot 7.1. Hook 10 is then used to pull the end 101 back through the loop 103 formed by the string through the motion of the clip support arm 3. With the hook still attached to end 101, tension may be applied to the other end of the string, either by a user or by another pneumatic device, to tighten the knot.

In order to perform these functions, the exemplary device includes other features, shown in the schematic of FIG. 3. Air compressor 11 provides compressed air to drive the pneumatic cylinders. Filter 12, regulator 13 and lubricator 15 are used regulate the air compressor and ensure proper function. Pressure gauge 14 is used to monitor the air pressure applied to the device during operation. FIG. 3 shows one example of how valving might be arranged to accomplish the objective of the disclosure. A two-position, three-way, directional control valve 16 is used to control moving of pneumatic cylinder 8, which includes a spring 19.1 to force a normally closed position. Three three-position four-way directional control valves 17.1-17.3 are used for direction control of pneumatic cylinder 5, pneumatic cylinder 6 and pneumatic cylinder 9, respectively. Seven two-way throttle valves 18.1-18.7 are used for speed control of all cylinders. The device also includes muffler 23 for releasing compressed air and controller 21 for controlling the operation of the valves and thereby operating the device.

Another aspect of the present disclosure provides a method for automated knot-tying utilizing the device described above. This method is best described in relation to FIGS. 4(*a*)-(*i*) and 5.

A first step 150 involves activating the first actuator to move from an original clip support arm position and rotate the clip support arm about the wire. The next step 152 involves attaching the end of the string to the clip. Then, in step 154, using the first actuator to return the clip support arm to the original clip support arm position, the end of the string is drawn over the wire. In step 156 the third actuator is activated to extend the rod from an original rod position. In step 158 the fourth actuator is activated to extend the hook. Then, in step 160, the second actuator is activated to rotate the clip support arm relative to the wire, wherein motion of the string is limited by the rod, thereby forming a loop. The next step 162 involves activating the first actuator to rotate the clip support arm around the wire. Then, in step 164, the fourth actuator is activated to retract the hook, wherein the clip releases the end of the string which is then carried by the hook through the loop. And, finally in step 166, the first, second, and third actuators are activated to return the rod to the original rod position and the clip support arm to the original clip support arm position. The device is moved to the next location, step 168, and the process is repeated.

FIG. 4(*a*) is the original position of the whole knotting process. In FIG. 4(*b*), clip support arm 3 is driven over the wire, where clip 4 catches the end 101 of string 100. In FIG. 4(*c*), pneumatic cylinder 5 extends rod 61 to catch string 100 as the clip support arm is returned to its original position, drawing the string over wire 2. In FIG. 4(*d*), pneumatic cylinder 9 extends hook 10. In FIG. 4(*e*), pneumatic cylinder 8 and motion arm 7 rotates clip support arm 3 and moves it laterally to the right side of the figure. In FIG. 4(*f*), clip support arm 3 crosses over the wire again to the other side with the end 101 of the string. In FIG. 4(*g*), pneumatic cylinder 9 retracts and hook 10 catches the end 101 of string to go through the loop 103, while clip 4 releases the end of string. In FIG. 4(*h*), pneumatic cylinder 5 retracts, and the knot is achieved as tension is applied to string 100. In FIG. 4(*i*), pneumatic cylinder 8 rotates back, and all parts return to the original position.

It should be emphasized that the above-described embodiments of the present device and process are merely possible examples of implementations and merely set forth for a clear understanding of the principles of the disclosure. Many different embodiments of the disclosure described herein may be designed and/or fabricated without departing from the spirit and scope of the disclosure. For example, string 100 may encompass many different types of stranded or solid structures, including for example wire, cable, twine, etc. Also, the pneumatic cylinders may be replaced by electric motors including linear motors, or other actuators. All these and other such modifications and variations are intended to be included herein within the scope of this disclosure and protected by the following claims. Therefore the scope of the disclosure is not intended to be limited except as indicated in the appended claims.

The invention claimed is:

1. A knot-tying device for tying a secure knot around a structure with a string;
    a clip attached to the end of a clip support arm, the clip support arm being rotatably attached to a first actuator, wherein the clip support arm is curved to cross over the structure when rotated, and wherein the clip attaches to the end of the string;
    a motion arm attached to a second actuator for rotating the clip support arm relative to the structure;
    a rod attached to a third actuator for limiting motion of the string during rotation of the clip support arm by the motion arm;
    a hook attached to a fourth actuator for retrieving the end of the string from the clip; and
    a controller for controlling motion of the actuators.

2. The knot-tying device of claim 1, wherein the structure is a wire.

3. The knot-tying device of claim 2, wherein the wire is part of a trellis network.

4. The knot-tying device of claim 1, wherein the actuators are pneumatic cylinders.

5. The knot-tying device of claim 4, further comprising a compressor and a plurality of valves operated by the controller which result in the actuation of the pneumatic cylinders.

6. The knot-tying device of claim 1, wherein the actuators are linear motors.

7. The knot-tying device of claim 1, wherein the device is arranged such that rotation of the clip support arm by the motion aim and the limiting function of the rod cause the string to form a loop, and wherein the hook draws an end of the string through the loop.

8. The knot-tying device of claim 1, further comprising a pair of suspension arms, wherein the device holds the wire in the proper position for the knot to be tied.

9. The knot-tying device of claim 1, wherein the motion arm is attached to a pivot which governs movement of the motion arm.

10. The knot-tying device of claim 1, wherein the secure knot is a clove-hitch.

11. A method for using a device in accordance with claim 1 to tie a knot around a wire with a piece of string, comprising the steps of:
- activating the first actuator to move from an original clip support arm position and rotate the clip support arm about the wire;
- attaching the end of the string to the clip;
- using the first actuator to return the clip support arm to the original clip support arm position, thereby drawing the end of the string over the wire;
- activating the third actuator to extend the rod from an original rod position;
- activating the fourth actuator to extend the hook;
- activating the second actuator to rotate the clip support arm relative to the wire, wherein motion of the string is limited by the rod, thereby forming a loop;
- activating the first actuator to rotate the clip support arm around the wire;
- activating the fourth actuator to retract the hook, wherein the clip releases the end of the string which is then carried by the hook through the loop; and
- activating the first, second, and third actuators to return the rod to the original rod position and the clip support arm to the original clip support arm position.

12. The method of claim 11, wherein the second actuator is attached to the clip support arm by virtue of a motion arm.

13. The method of claim 12, wherein the motion arm is attached to a pivot which governs the movement of the motion arm.

14. The method of claim 11, wherein the wire is part of a trellis network.

15. The method of claim 11, wherein the actuators are pneumatic cylinders.

16. The method of claim 11, further comprising a step of applying tension to the string to tighten the knot.

* * * * *

UNITED STATES PATENT AND TRADEMARK OFFICE
CERTIFICATE OF CORRECTION

| | | |
|---|---|---|
| PATENT NO. | : 8,573,656 B1 | Page 1 of 1 |
| APPLICATION NO. | : 13/559408 | |
| DATED | : November 5, 2013 | |
| INVENTOR(S) | : Zhang et al. | |

It is certified that error appears in the above-identified patent and that said Letters Patent is hereby corrected as shown below:

In the Claims

Claim 7, Col. 4, line 59, "aim" should be --arm--.

Signed and Sealed this
Twenty-sixth Day of August, 2014

Michelle K. Lee
*Deputy Director of the United States Patent and Trademark Office*